3,485,781
CROSS-LINKING OF WATER-SOLUBLE OR
WATER-DISPERSIBLE POLYESTERS WITH
DICHROMATES
Walter A. Wallman and David D. Taft, Minneapolis,
Minn., assignors to Ashland Oil & Refining Company,
Ashland, Ky., a corporation of Kentucky
No Drawing. Filed Jan. 5, 1968, Ser. No. 695,882
Int. Cl. C08g *17/14;* C09d *3/64*
U.S. Cl. 260—22               11 Claims

ABSTRACT OF THE DISCLOSURE

Water-insoluble, cross-linked films of water-soluble or water-dispersible polyester resins are made by adding 1% to 10%, based on solid weight, of a water-soluble dichromate salt to a polyester solution, depositing a film, and curing by heating the film to a temperature of 200° F., to 500° F. for a period of 1 to 30 minutes. The compositions are useful for baking coatings and enamels.

BACKGROUND OF THE INVENTION

Water-based paints and coating systems are becoming increasingly popular as compared to organic solvent-based paints because of the numerous advantages that water-based systems have to offer. These advantage include the reduction of fire hazard, reduction in odors, elimination of toxicity problems, lower cost because of the use of less expensive ingredients, and convenience in the ability to use water to thin the coating composition or paint as well as to clean the utensils used in the coating or painting operation. A number of water-soluble or water-dispersible polyester resins, highly suitable for coating and paint applications, are currently in use. Generally, the utility of these water-soluble or water-dispersible polyesters depends upon whether or not the polyester can be easily cross-linked or insolubilized after application. Typically, known water-soluble or water-dispersible polyesters are blended with cross-linking resins such as phenol-aldehyde and aminoplast resins. It is apparent that for many, if not most, application it is necesary that the base resin in the applied coating composition or paint be insoluble in water. The present invention offers an alternative to the addition of cross-linking resins as a means for insolubilizing water-soluble or water-dispersible polyesters.

SUMMARY OF THE INVENTION

It has now been found that water-dispersible polyester resins may be made water-insoluble as a result of being cross-linked through water-soluble dichromate salts, which are added to the resin and reacted by heat. By the use of these dichromate cross-linking agents it is possible to eliminate or reduce the amount of cross-linking resins which formerly had to be added to water-soluble or water-dispersible polyester resins to make the finished films water-insoluble and solvent-resistant. The polyester/dichromate compositions of this invention may be adapted to a number of coating and paint applications where a baking step can be tolerated.

Accordingly, it is an object of this invention to produce a novel means for cross-linking and insolubilizing water-soluble or water-dispersible polyester resins.

Another object of this invention is to provide coatings which are applied from a dispersion or solution in water or organic solvent and which, after curing, are resistant to water and organic solvents.

Still another object of this invention is to eliminate in whole or in part, the use of conventional cross-linking resins in compositions containing water-soluble polyester resins.

Further objects will be apparent from the more detailed description of this invention which follows.

This invention relates to water-soluble or water-dispersible polyester resins which are then cross-linked and thereby insolubilized. The polyester resins are rendered cross-linkable simply by adding the water-soluble dichromate salt to the polyester solution or dispersion, Any of the well known water-soluble dichromate such as sodium dichromate, potassium dichromate, or ammonium dichromate may be used in this invention. Ammonium dichromate is particularly preferred.

The dichromate is preferably present in an amount from 2% to 6% of the polyester resin solids, but as little as 1% and as much as 10% may be used. Large excesses of dichromate may be used to the point of incompatibility in the film but no advantages are thereby attained. Furthermore, the use of excesses is wasteful of the dichromate and results in highly colored films which are often undesirable. The minimum amount of dichromate which will effect curing to the degre desired should be used.

Films of the polyester/dichromate mixture are cross-linked simply by heating at a temperature from about 200° F. to 500° F., preferably 250° F. to 350° F., for a period of time of about 1 to 30 minutes. Generally, higher temperatures are combined with shorter times, and conversely, lower temperatures with longer times to achieve similar results. Of course, the combination of time and temperature will, to a certain degree, determine the extent of cross-linking which will take place, and therefore the conditions are selected to obtain the degree of insolubilization or cross-linking desired. These compositions will also cross-link at room temperature after long periods of time.

A variety of water-soluble or water-dispersible polyesters are suitable for cross-linking by the means of this invention. Included are polyesters derived from drying oils, those derived from non-drying oils, and those polyesters which contain no oil components whatsover.

A water-dispersible, drying oil-containing polyester of this invention is disclosed in copending application Ser. No. 481,119 filed Aug. 19, 1965. The polyester of this copending application comprises the following components, in weight percent:

| | |
|---|---|
| Drying oil | 20–45 |
| Polyhydric alcohol containing 3–6 hydroxyl groups/molecule | 15–40 |
| Polyoxyethylene glycols having a molecular weight from 600 to 6000 | 5–15 |
| Non-oxidizing, non-oil, monobasic carboxylic acid acid having 6–18 carbon atoms—molecule | 10–20 |
| Dicarboxylic acid or anhydride having 4–10 carbon atoms/molecule | 20–35 |

A non-drying, oil-containing polyester suitable for the process of this invention is prepared by substituting a non-drying oil for the drying oil in the above formulation.

Examples of water-dispersible and water-soluble polyester resins containing no oil components are shown, for instance, in Examples 2 and 5 of U.S. Patent 3,223,659 to Curtice et al. The polyesters disclosed therein generally comprise the following ingredients, in weight percent:

| | |
|---|---|
| Saturated monocarboxylic acids | 15–30 |
| Saturated dicarboxylic acids | 22–40 |
| Polyethylene or polypropylene glycol | 4–19 |
| Polyhydric alcohol, other than polyethylene or polypropylene glycol | 22–40 |

Still other suitable water-dispersible polyester resins are disclosed in U.S. Patent Nos. 2,634,245 to Arndt and 3,001,961 to Armitage et al.

As has been shown, a variety of polyester resins are applicable in the present process. All that is required is the presence of cross-linkable, free hydroxyl or free carboxyl groups which are common to polyester resins.

The term "water-soluble or water-dispersible" includes resins having solubility or dispersibility in aqueous solutions containing additives such as ammonia, organic amines, surfactants, and the like, which are added for the purpose of improving solubility or dispersibility of the resin. Also included are aqueous systems comprising a major proportion of water and containing, in addition, a minor proportion of a water-miscible or water-immiscible solvent, cosolvent, or diluent for the resin.

Essentially, the present invention is directed to insolubilization and cross-linking of polyester resins which are substantially or totally soluble or dispersible in water. In addition to the effect of insolubilizing the polyester resin film with respect to water, the addition of dichromate reduces the solubility of the polyester resin in other solvents, as will be seen in the examples set forth below. Furthermore, the adhesion between the coating and the coated substrate is improved by the addition of dichromate to the polyesters in accordance with the present invention.

The novel compositions of this invention may be modified physically and/or chemically by the addition of agents such as pigments, extenders, plasticizers, ultraviolet light stabilizers, solvents, drying oils, coloring agents, pacifiers, release agents, and lubricants as is well known in the coating and paint arts. The dichromate curing agent of this invention may be used in conjunction with other conventional resinous or non-resinous curing agents well known for use with polyester resins, such as phenol-aldehyde resins and aminoplast resins. It is to be emphasized, however, that auxiliary cross-linking agents are not necessary.

The coating compositions of this invention may take many forms, dependent upon their modification as discussed above. These compositions are employed as coatings for substrates of all types, e.g., wood, paper, glass, ceramics, ferrous metals, non-ferrous metals, and the like. The coatings may be applied by conventional procedures such as dipping, spraying, and brushing.

The invention may be more fully understood by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the preparation of a water-dispersible polyester which may be cross-linked by the process of this invention.

The following ingredients were used:

| | Parts by weight |
|---|---|
| Safflower oil | 261.1 |
| Pentaerythritol | 154.0 |
| p-Tertiary-butyl benzoic acid | 186.1 |
| Polyoxyethylene glycol (MW=2700–3200) | 88.8 |
| Lithium hydroxide | .07 |
| Phthalic anhydride | 205.5 |
| Isophthalic acid | 73.6 |
| Pentaerythritol | 133.37 |

The first five ingredients above were charged into a flask fitted with a thermometer, a mechanical agitator, and a water trap to which was attached a reflux condenser. The temperature was raised to 460° F. and maintained at that level until an acid value of less than 5 was obtained. The resin was cooled and the last three ingredients were added. The reaction was then heated to 430° F. until an acid value of 14.4 was obtained. Triethyl amine (2.2 parts) was then added to the resin which was then dispersed in water. A white, opalescent emulsion having a viscosity of 4000 cps., a pH of 7.15, and non-volatiles of 42.5% was obtained.

EXAMPLE 2

This example illustrates the cross-linking of the polyester of Example 1 with dichromate.

A mixture of 56.5 g. of the polyester dispersion of Example 1 (22 g. solids) and 5.5 g. of a 20% water solution of ammonium dichromate was made to give a solution containing 2% of dichromate based on polyester. A 3-mil wet film was cast on a glass plate and cured at 250° F. for twenty minutes. The results are summarized in Table I wherein comparisons are made with a control sample constituting the polyester of Example 1 without dichromate.

TABLE I

| | With Dichromate | Control Without Dichromate |
|---|---|---|
| Appearance | Green | Clear. |
| Tack RT | None | Very tacky. |
| Tack 250° F | do | Liquid plastic. |
| Mar resistance | Good | Very poor. |
| Sward hardness | 32 | 2. |
| Water resistance 15' | No surface effect, very slight loss of adhesion. | Dissolves. |

EXAMPLE 3

This example illustrates the preparation of another water-dispersible polyester which may be cross-linked with water-soluble dichromate in accordance with this invention.

A water-soluble resin was prepared from the following ingredients:

| | Parts by weight |
|---|---|
| (A) p-Tertiary-butyl benzoic acid | 287 |
| (B) Hydrogenated Bisphenol A | 96.8 |
| (C) Trimethylol ethane | 194 |
| (D) Polyoxyethylene glycol (average mol wt. 1450) (Carbowax 1540) | 128 |
| (E) Triphenyl phosphite | 1.0 |
| (F) Carbitol acetate | 44.5 |
| (G) Diethyl carbitol | 22.2 |
| (H) Isophthalic acid | 190.5 |
| (I) Adipic acid | 120.5 |
| (J) Trimethylol ethane | 51 |

Parts A–G were charged to a reactor fitted with a mechanical stirrer, thermometer, water-separator, and reflux condenser. Parts A–G were all heated together to a temperature of 480° F. and held until the acid value was in the range of 10–12. The reaction mixture was thereafter cooled to 300° F. and the isophthalic acid, adipic acid, and the remainder of the trimethylol ethane added. The temperature of the reaction mixture was raised to 490° F. to 500° F. and maintained under agitation at that temperature for 8 hours, until the acid value was in the range of 10–12.

The product, on cooling, was a clear, viscous, non-oxidizing resin.

The resin at 70% non-volatile in xylene had a Gardner viscosity of 10–12 stokes.

A clear water solution was prepared from the foregoing resin by the following procedure:

1000 parts by weight of the resin prepared as described above and at 100% non-volatile were admixed with enough triethyl amine to neutralize about 98% of the residual base alkyd acidity at a temperature of about 165° F. in a system fitted for reflux. This neutralized base resin was then added to 1283 parts by weight of water over a period of 20 to 40 minutes.

The resulting product was a clear solution which had the following properties:

| | |
|---|---|
| Non-volatile _____percent__ | 41–43 |
| pH _____ | 6.5–7.5 |
| Viscosity _____cps__ | 600–1600 |

EXAMPLE 4

This example illustrates the cross-linking of the polyester of Example 3 with dichromate.

A mixture of 31 g. of the polyester dispersion of Example 3 (12.4 g. solids) and 3 g. of 20% water solution of ammonium dichromate was made to give a solution containing about 5% of dichromate based on the weight of the polyester. The clear orange solution was cast as a 3 mil wet film on a glass plate and cured at 250° F. for 20 minutes. The results are summarized in Table II in comparison with a control sample of the polyester of Example 3 without dichromate.

TABLE II

| | With Dichromate | Control Without Dichromate |
|---|---|---|
| Appearance | Green, some pinholes | Clear, some pinholes. |
| Tack (RT) | None | Very tacky. |
| Tack (250° F.) | do | Liquid plastic. |
| Mar resistance | Fair to poor | Very poor. |
| Adhesion to glass | Excellent | Fair. |
| Sward hardness | 22 | 4. |
| Water resistance (15′) | No surface effect | Dissolves. |
| Xylol resistance (15′) | Swells | Do. |
| Acetone resistance (5′) | do | Do. |

Although the invention has been described in considerable detail with reference to certain preferred embodiments, it will be understood that variations and modifications may be made within the spirit and scope of the invention as defined in the appended claims.

What is claimed is:

1. A composition of matter capable of being cross-linked by heat to water-insoluble films comprising a mixture of:
   (1) a water-soluble or water-dispersible polyester resin;
   (2) a water-soluble dichromate salt selected from the group consisting of sodium, potassium, and ammonium dichromates, in an amount of 1% to 10% by solids weight of said polyester resin; and
   (3) a solvent for (1) and (2) comprising a major proportion of water.

2. The composition of matter of claim 1 in which said dichromate salt (2) is ammonium dichromate.

3. The composition of matter of claim 1 in which said solvent (3) is substantially all water.

4. The composition of matter of claim 1 in which said polyester resin (1) comprises in weight percent, the reaction product of:

| | |
|---|---|
| Saturated monocarboxylic acids _____ | 15–30 |
| Saturated dicarboxylic acids _____ | 22–40 |
| Polyethylene glycol or polypropylene glycol_____ | 4–19 |
| Polyhydric alcohol, other than polyethylene glycol or polypropylene glycol _____ | 22–40 |

5. The composition of matter of claim 1 in which said polyester resin (1) comprises, in weight percent, the reaction product of:

| | |
|---|---|
| Drying oil _____ | 20–45 |
| Polyhydric alcohol containing 3–6 hydroxyl groups/molecule _____ | 15–40 |
| Polyoxyethylene glycols having a molecular weight from 600 to 6000 _____ | 5–15 |
| Non-oxidizing, non-oil, monobasic carboxylic acid, having 6–18 carbon atoms/molecule_____ | 10–20 |
| Dicarboxylic acid or anhydride having 4–10 carbon atoms/molecule _____ | 20–35 |

6. A method of preparing water-insoluble films from water-soluble or water-dispersible polyester resins, comprising the steps of:
   (A) preparing a solution or dispersion of a water-soluble or water-dispersible polyester resin in a solvent medium, a major proportion of which is water;
   (B) adding a water-soluble dichromate salt selected from the group consisting of sodium, potassium, and ammonium dichromates, in an amount of 1% to 10% by weight of said polyester resin;
   (C) forming a film of the polyester/dichromate mixture; and
   (D) drying said film at a temperature of about 200° F. to 500° F. for a period of about one to thirty minutes.

7. The method of claim 6 in which said dichromate salt is ammonium dichromate.

8. The method of claim 6 in which said solvent medium is substantially all water.

9. The method of claim 6 in which said polyester resin comprises, in weight percent, the reaction product of:

| | |
|---|---|
| Saturated monocarboxylic acids _____ | 15–30 |
| Saturated dicarboxylic acids _____ | 22–40 |
| Polyethylene glycol or polypropylene glycol ____ | 4–19 |
| Polyhydric alcohol, other than polyethylene glycol or polypropylene glycol _____ | 22–40 |

10. The method of claim 6 in which said polyester resin comprises, in weight percent, the reaction product of:

| | |
|---|---|
| Drying oil _____ | 20–45 |
| Polyhydric alcohol containing 3–6 hydroxyl groups/molecule _____ | 15–40 |
| Polyoxyethylene glycols having a molecular weight from 600 to 6000 _____ | 5–15 |
| Non-oxidizing, non-oil, monobasic carboxylic acid, having 6–18 carbon atoms/molecule _____ | 10–20 |
| Dicarboxylic acid or anhydride having 4–10 carbon atoms/molecule _____ | 20–35 |

11. An article coated with the cured composition of claim 1.

References Cited

UNITED STATES PATENTS

| | | | |
|---|---|---|---|
| 3,001,961 | 9/1961 | Armitage et al. | 260—22 |
| 3,036,934 | 5/1962 | Horton et al. | 117—132 |
| 3,053,693 | 9/1962 | Schuster et al. | 117—75 |
| 3,223,659 | 12/1965 | Curtice et al. | 260—22 |
| 3,297,605 | 1/1967 | Schroeder et al. | 260—22 |
| 3,325,428 | 7/1967 | Graver et al. | 260—22 |

DONALD E. CZAJA, Primary Examiner

R. W. GRIFFIN, Assistant Examiner

U.S. Cl. X.R.

117—161, 167; 260—29.2, 32.6, 75